US007656439B1

(12) United States Patent
Manico et al.

(10) Patent No.: US 7,656,439 B1
(45) Date of Patent: Feb. 2, 2010

(54) PORTABLE DOCK FOR A CAMERA

(75) Inventors: Joseph A. Manico, Rochester, NY (US);
John R. Fredlund, Rochester, NY (US);
Thomas A. Mackin, Hamlin, NY (US)

(73) Assignee: Eastman Kodak Company, Rochester, NY (US)

( * ) Notice: Subject to any disclaimer, the term of this patent is extended or adjusted under 35 U.S.C. 154(b) by 541 days.

(21) Appl. No.: 10/935,140

(22) Filed: Sep. 7, 2004

(51) Int. Cl.
*H04N 5/76* (2006.01)
(52) U.S. Cl. .................. 348/231.3; 348/207.1; 348/372
(58) Field of Classification Search ............. 348/207.1, 348/207.2, 231.2, 231.3, 231.4, 231.5, 231.7, 348/231.99, 372, 231.6
See application file for complete search history.

(56) References Cited

U.S. PATENT DOCUMENTS

| | | | |
|---|---|---|---|
| 5,717,308 A | 2/1998 | Nishitani et al. | |
| 6,043,626 A | 3/2000 | Snyder et al. | |
| 6,133,642 A * | 10/2000 | Hutchinson | 290/1 A |
| 6,138,826 A | 10/2000 | Kanamori et al. | |
| 6,727,678 B2 * | 4/2004 | Yu | 320/134 |
| 6,734,915 B2 * | 5/2004 | Nagaoka | 348/375 |
| 6,765,364 B2 * | 7/2004 | Fang | 320/110 |
| 6,819,866 B2 * | 11/2004 | Da Silva | 396/27 |
| 6,914,340 B2 * | 7/2005 | Becker et al. | 290/1 R |
| 6,977,479 B2 * | 12/2005 | Hsu | 320/101 |
| 6,977,688 B2 * | 12/2005 | Hanada et al. | 348/372 |
| 7,010,137 B1 * | 3/2006 | Leedom et al. | 381/328 |
| 7,038,425 B2 * | 5/2006 | Chuang | 320/132 |
| 2001/0052942 A1 * | 12/2001 | MacCollum et al. | 348/333.01 |
| 2002/0003584 A1 * | 1/2002 | Kossin | 348/373 |
| 2002/0071035 A1 * | 6/2002 | Sobol | 348/207 |
| 2002/0149344 A1 * | 10/2002 | Harvey | 320/132 |
| 2002/0149695 A1 * | 10/2002 | Kayanuma | 348/375 |
| 2003/0030731 A1 | 2/2003 | Colby | |

(Continued)

FOREIGN PATENT DOCUMENTS

JP 09-046402 2/1997

(Continued)

OTHER PUBLICATIONS

"Dan's Quick Guide to Memory Effect, You Idiots". Aug. 2, 2002._Internet Archive_. <http://web.archive.org/web/20020802195258/http://www.dansdata.com/gz011.htm>.*

(Continued)

*Primary Examiner*—Tuan Ho
*Assistant Examiner*—Chriss S Yoder, III
(74) *Attorney, Agent, or Firm*—Roland R. Schindler

(57) ABSTRACT

Portable docks are provided for use with a camera having a camera memory and a camera power supply. A dock has a dock memory, a dock power supply with sufficient power so that the camera power supply can be charged with at least sufficient power to enable the camera to perform completely at least one additional camera function, and an electrical connector adapted to engage a mating camera connector for data communication and power exchange therethrough. A control system enables the transfer of image related data between the camera memory and the dock memory. The dock memory, power supply, electrical connector, and control system are held by a body adapted to receive the camera so that the camera connector can engage the electrical connector.

26 Claims, 9 Drawing Sheets

U.S. PATENT DOCUMENTS

2003/0063196 A1* 4/2003 Palatov et al. ............ 348/211.2
2003/0076442 A1* 4/2003 Kawaguchi et al. ......... 348/375
2003/0160890 A1* 8/2003 Caspe et al. ................ 348/372

FOREIGN PATENT DOCUMENTS

JP    2004-302353         12/2003
WO    WO 02/063451 A1 *   8/2002

OTHER PUBLICATIONS

Vosonic, "X's—Drive Pro VP3310", www.vosonic.com, Aug. 2004.
Nixvue Systems, "Digital Album II", www.nixvue.com, Aug. 2004.
Archos, "Gmini™ 220" and "Pocket Video Recorder AV480", www.archos.com, Aug. 2004.
Delkin Devices, "eFilm™ PicturePad", www.delkin.com.
Innoplus Ltd., "Phototainer", www.innoplus.com, Aug. 2004.
Apacer, "Disc Steno CP200", www.apacer.com, Aug. 2004.
Cordmedia Ltd., "DigiMagic DM 220 8x", www.digi-magic.com, Aug. 2004.
Practical Photography, "The Portable Digital Storage Test", pp. 110-115.
Fujitsu Ltd., "DynaMO 640 Pocket Manual", Nov. 2002, 1st edition, Nov. 2002.

* cited by examiner

PORTABLE DOCK FOR A CAMERA

FIELD OF THE INVENTION

This invention relates to accessories for digital cameras in particular, docking stations for use therewith.

BACKGROUND OF THE INVENTION

There are digital camera docking systems currently available, such as the Kodak EasyShare™ model LS443, that provide a 'safe harbor' for the camera, and connect to a computer. This connection is an interface that firstly passes an electrical source to the dock for recharging the batteries in the camera, and secondly, passes the image memory content from the camera to the computer, either automatically, or as selected by the user. It is noted here that video sequences and sound may also be captured, digitized, and stored by a digital camera.

In a normal sequence for a digital imaging system then, the camera is removed from the dock and taken to another location(s) where images are captured by the camera's sensor, digitized, and stored, usually on a removable solid state storage medium of various formats, hereafter referred to generically as 'memory cards'. The camera is then returned to the dock to recharge the camera batteries, and to transfer the stored images to the computer's Hard Drive or other mass storage device, such as a server on a network, either internal, or external such as the Internet. The image transfer is done to clear the memory card, so that it can be used again to temporarily store further captured images.

Digital cameras are used for various purposes: for personal remembrance, such as vacations, family milestones, and trips to entertainment venues; and official/business, such as for insurance claims and other documentation purposes. In many situations, users desire a greater number of images to be captured on a picture-taking outing, e.g. away from the computer, than allowed by the constraint of the memory card capacity as typically measured by the number of bits of digital information that it can hold. This is an economic issue for many users due to relatively unfavorable pricing/capacity ratios for memory cards. This capacity limitation is compounded when the user wishes to save images in a high or the highest resolution available with the camera. For example, doubling the resolution of an image results in four times the image data. Furthermore, when the user wishes to avoid compression artifacts, lossless compression methods must be used that greatly increase the required memory allocation for resultant image file storage, when compared to the same files after lossy compression, such as the jpeg standard. When users encounter these situations while away from the computer, their only recourse is to purchase additional and/or larger capacity memory cards.

Alternatively, portable digital storage devices such as the X's-Drive Pro sold by Vosonic, Chu-Pei City, Hsi-Chu, Taiwan; the Digital Album 2 sold by Nixvue, Snohomish, Wash., USA; the Gmini 220 or Pocket Video Recorder 4V480 sold by Archos, Inc., Irvine, Calif., USA; the eFilm PicturePAD sold by Delkin Devices, Poway, Calif., USA; or the Phototainer sold by Innoplus Ltd., Dae Jeon City, Korea, provide portable digital memory storage devices that can be plugged into a digital camera and can download images from the camera for storage in a multi-gigabyte hard disk. Other similar devices such as the Disc Steno CP 200 sold by Apacer Technology Inc., Taipei, Taiwan; the Dynamo640 Photo sold by Fujitsu, Sunnyvale, Calif., USA; or the DM220 8XCD Burner sold under the Digimagic brand by Cordmedia (Europe) Ltd., East Sussex, United Kingdom enable a user to download images for storage on optical media. However, such devices are highly expensive, and only provide a download and store function.

It is also well known that current digital camera battery capacities are such that the available operational time of a digital camera between recharging sessions is often inadequate, e.g. while away from the computer and the dock, many users would like to take more pictures than a single charge allows. When users encounter this situation, their only recourse is to have purchased additional batteries as is described in U.S. Pat. No. 5,717,308 entitled "Electric Supply Equipment for a Camera" filed by Nishiani on Oct. 18, 1996, to connect the camera to a portable charger as described in U.S. Pat. No. 6,043,626 entitled "Auxiliary Battery Holder With Multicharger Functionality" filed by Snyder et al. on Aug. 1, 1997 or to connect the camera to a separate plug-in charger. The latter might not even be an option, as with some camera/dock systems, the camera can only be recharged by the dock. There is further always a common desire to minimize jumbling and snagging of interconnecting wires, for example of a charger, to reduce both the possibility of damage, and the obviously wasted time spent untangling them.

Owners often desire to have a protective case for their digital cameras, and can often purchase one specifically designed for their camera, or at least a case, less desirably, of a general design usable with a variety of cameras. Currently available products have the sole purpose and capability, of protecting the camera.

These additional items: memory cards and/or digital storage devices, batteries, charger, and protective case, satisfy the immediate needs of the user/owner of a digital camera during picture taking outings away from their computer and dock. However, this necessitates carrying and handling these items. Additionally, these independent solutions are collectively expensive, being separately produced and marketed, therefore lacking the known economies of integration.

Thus, there is a need in the art for a portable solution that enables a digital camera to operate away from a conventional computer and charging system yet conveniently provides similar functionality. This combination product would further reduce the effort and time spent locating and determining each item's usability and inter-operability with their camera.

SUMMARY OF THE INVENTION

In one aspect of the invention, a dock for use with a camera having a camera memory and a camera power supply is provided. The dock has a dock memory, a dock power supply with sufficient power so that the camera power supply can be charged with at least sufficient power to enable the camera to perform completely at least one additional camera function, and an electrical connector adapted to engage a mating camera connector for data communication and power exchange therethrough. A control system enables the transfer of image related data between the camera memory and the dock memory. The dock memory, power supply, electrical connector, and control system are held by a body adapted to receive the camera so that the camera connector can engage the electrical connector.

In another aspect of the invention, dock is provided for use with a camera having a camera memory and a rechargeable camera power supply. The dock has a dock memory, a power supply having a source of power adapted to charge the camera power supply with power from the source of power, and an electrical connector adapted to engage a mating camera connector power exchange therethrough. A wireless communications system is provided and adapted to communicate with the camera for data exchange. A control system operates the wireless communication system to enable the transfer of image related data between the camera memory and the dock memory. A body holds the dock memory, power supply, electrical connector and control system. The body is adapted to receive the camera so that the camera electrical connector can engage the electrical connector.

In yet another aspect of the invention, a dock is provided for use with a camera. The dock has a memory a power supply means and an electrical connector means for engaging a camera connector so that data and power can be exchanged therethrough with the camera. Also provided are a control means for controlling the exchange of at least one of the power and data exchanged through the electrical connector; and a body holding the memory power supply means, electrical connector means and control means. The power supply means has sufficient power storage capacity to provide enough power to the camera to enable the camera to perform completely at least one camera function using the provided power.

DETAILED DESCRIPTION OF THE INVENTION

According to the present invention, a portable dock is provided that performs the functions of a computer dock for a digital camera while away from the computer, such as while traveling.

Figure 1:
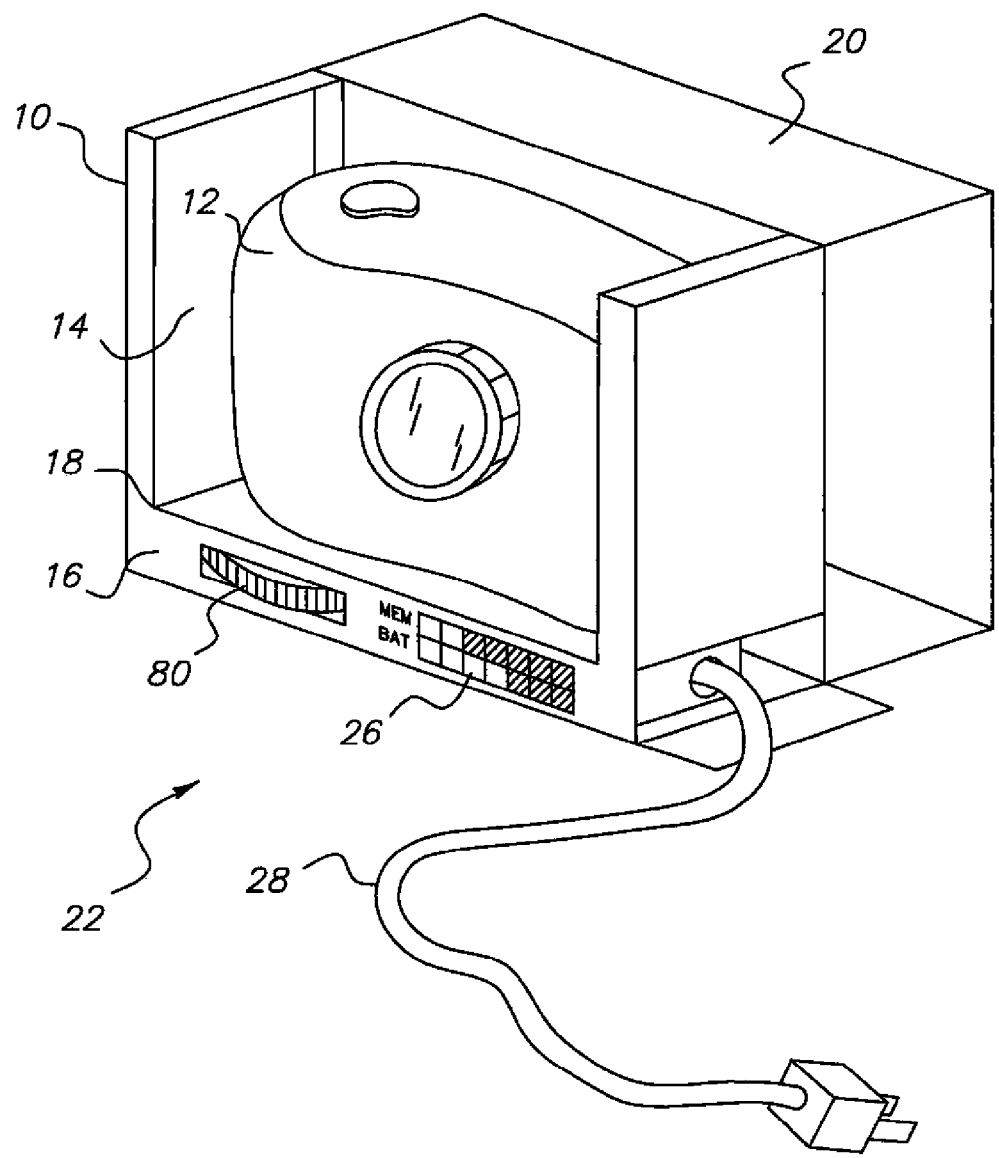
FIG. 1 is an illustration of an embodiment of the dock of the present invention having a camera therein.
Figure 2:
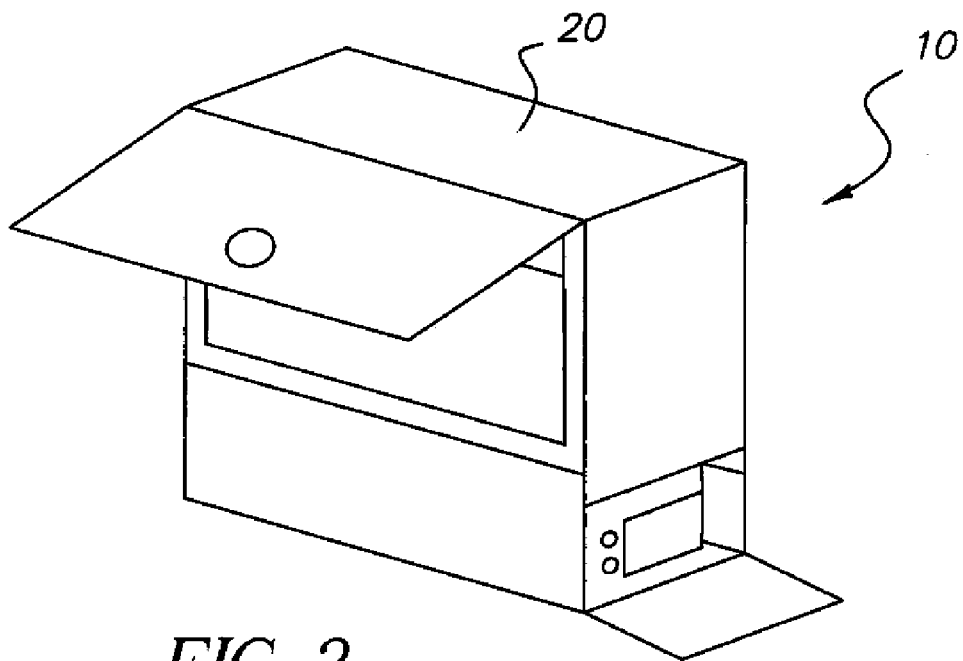
FIG. 2 is an illustration of an embodiment of the dock of the present invention with a cover partially closed.
Figure 3:
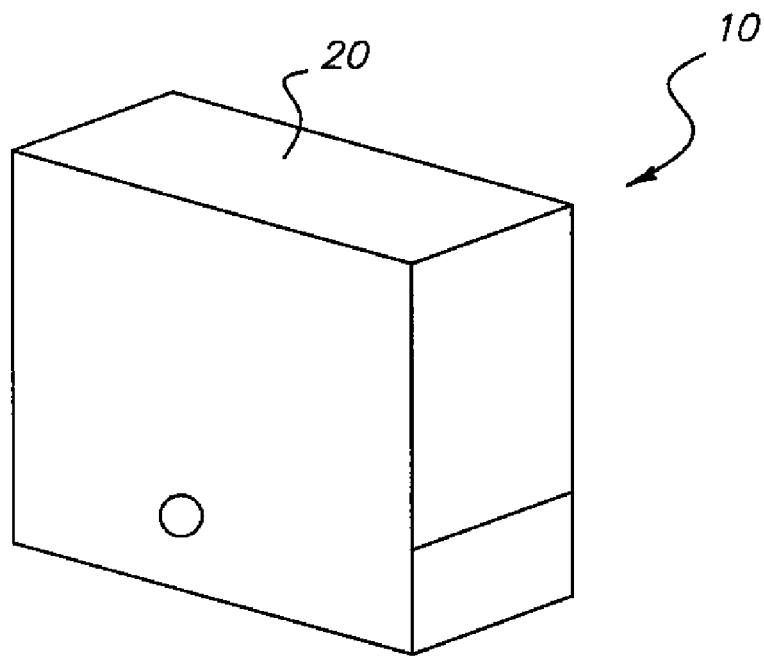
FIG. 3 is an illustration of an embodiment of the dock of the present invention with a cover fully closed.

FIG. 1 shows a perspective view of one embodiment of a dock 10 having a camera 12 stored in a receiving area 14 therein. As shown in FIG. 1, dock 10 comprises a body 16 with an opening 18 provided so that camera 12 can be inserted into and removed from receiving area 14. A cover 20 is also shown in FIG. 1. As is shown in FIG. 1, cover 20 is shaped to engage body 16 so that when cover 20 is positioned in an open position shown in FIG. 1, camera 12 can be inserted and removed from receiving area 14. As is described in greater detail below, cover 20 can be moved through a partially closed position shown in FIG. 2 to a closed position shown in FIG. 3 where cover 20 is shown positioned to close opening 18.

Figure 4:
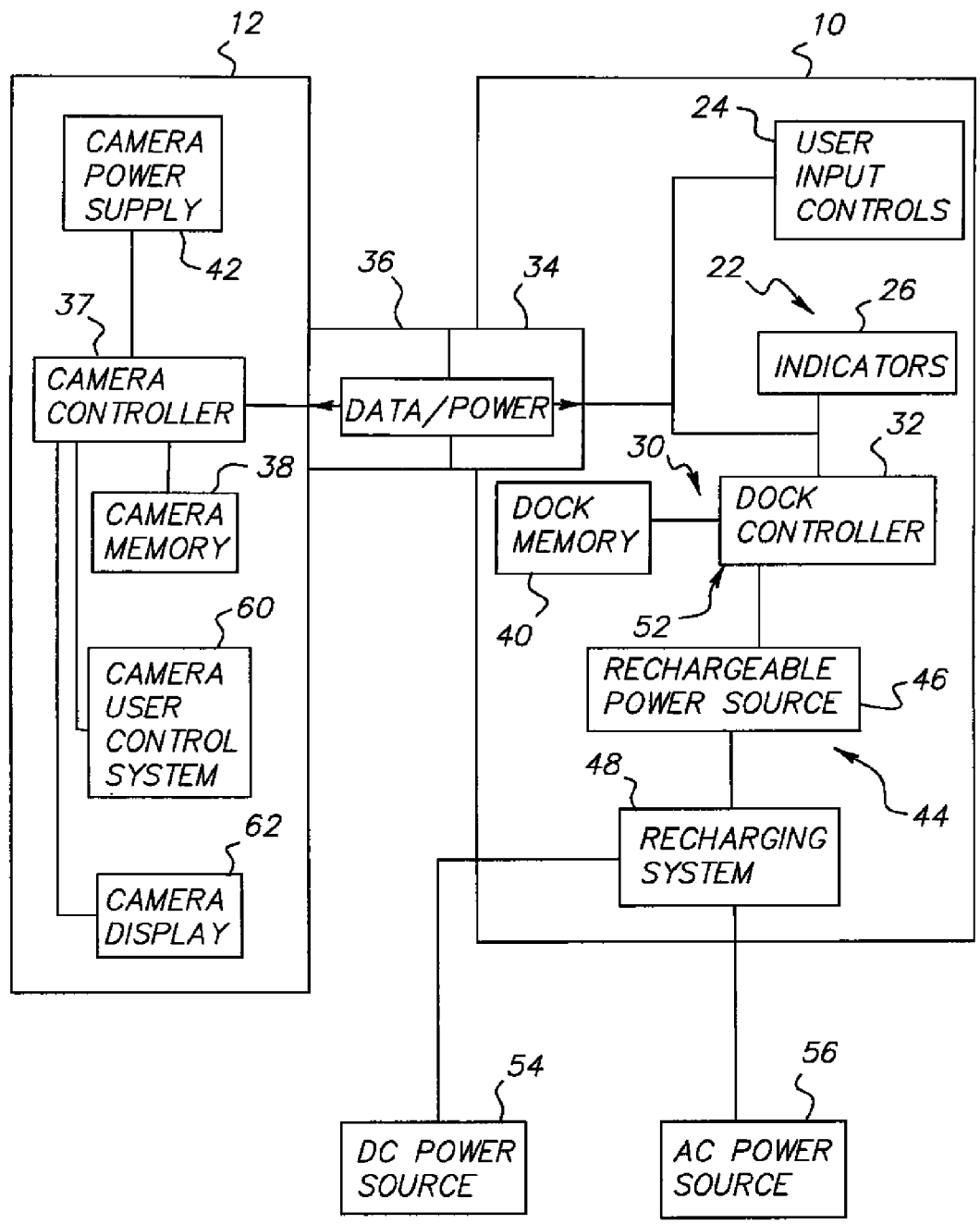
FIG. 4 is a schematic illustration depicting logical and electrical connections between the dock and a camera.

FIG. 4 shows a schematic illustration depicting a logical and electrical connection, between dock 10 and camera 12. As is shown in FIG. 4, dock 10 comprises a control system 30 comprising a controller 32. Controller 32 cooperates with an electrical connector 34 that, in this embodiment, is adapted to engage camera connector 36 for data communication and power exchange therethrough. Controller 32 can comprise any circuit or system capable of controlling operation of dock 10 as described herein, including but not limited to a microprocessor, microcontroller ASIC, programmable analog device or combination of discrete electronics. Controller 32 is adapted to enable the transfer of image related data between memory 38 in camera 12 and memory 40 in dock 10. As used herein, the term image related data comprises data representing one or more still images, sequences of still images, video sequences, video streams, audio sequences, metadata including information about the such still images, sequences of still images, video sequences, video streams, audio sequences, and any other text or data known in the art that can be stored in camera memory 38.

As is shown in FIG. 4, a dock power supply 44 provides power to controller 32 which in turn, uses a portion of this power for operation and, uses a remaining portion of the power for exchange with camera 12. In this way, a camera 12 having a limited capacity for storing image related data and a limited capacity for storing power, can connect to dock 10 for downloading image related data and for receiving operational power so that as camera 12 is removed from dock 10, camera 12 has a restored ability to capture additional image related data and has sufficient power to allow the camera 12 to operate for a predetermined time.

Dock 10 is adapted to execute image downloads and power charging without the involvement of a personal computer or like device. Dock 10 is also portable in that dock power supply 44 is capable of providing at least enough power to enable dock 10 to recharge camera power supply 42 so that power supply 42 contains sufficient additional power to enable camera 12 to perform at least one additional camera function such as capturing at least one additional image or other image related content or transferring image related content to dock 10 without dock 10 receiving power from an external source. Typically however, dock 10 has a dock power supply 44 that can provide sufficient power to power dock 10 so that multiple recharging and downloading sessions can be executed. In some embodiments, it can also be useful to ensure that dock power supply 44 is adapted to be able to download at least a useful proportion of data from camera memory 38 to dock memory 40.

Figure 5:
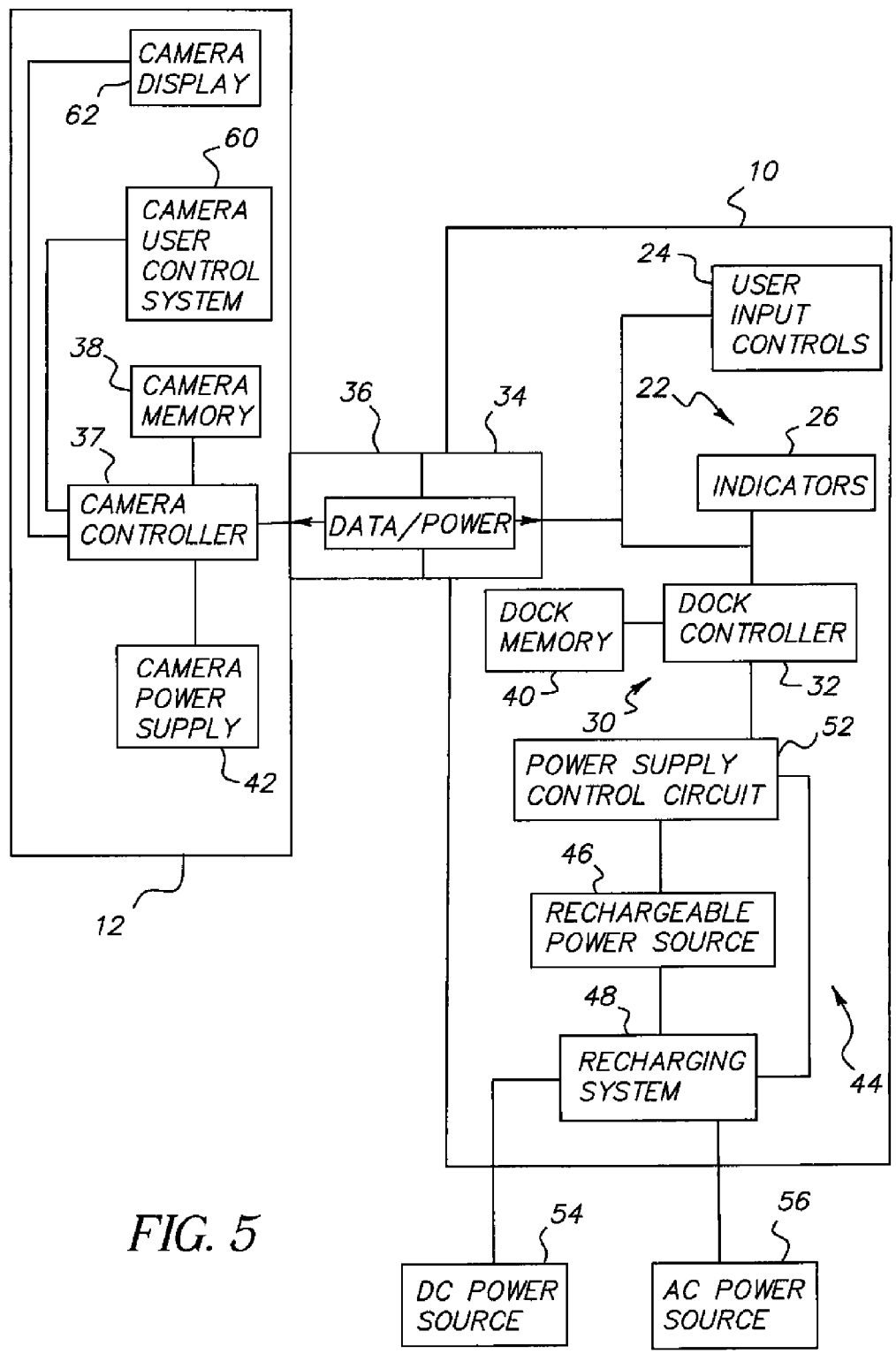
FIG. 5 shows an embodiment of the invention with a dedicated power supply control circuit.

In the embodiment of FIG. 4, dock power supply 44 contains a rechargeable power source 46 and at least one recharging system 48. In the embodiment of FIG. 5, recharging system 48 can comprise a regulator. The regulator is adapted to condition power received from external sources for charging the rechargeable power source 46 and for use by controller 32 for operation thereof, for recharging camera battery 42. Recharging system 48 can receive power from a variety of sources. For example, recharging system 48 can receive power from a direct current power source 54 such as an automotive, marine or other battery including but not limited stand alone replaceable batteries or groups of the same. In other embodiments, recharging system 48 can receive power from an alternating current source 56 such as a power line 28 providing a connection to a 110 volt or other voltage AC source. In still another embodiment, recharging system 48 can comprise a structure for generating power. For example, recharging system 48 can comprise a generator (not shown) adapted to convert kinetic energy into electrical power. Such a generator can be combined with a mechanism for storing potential mechanical energy and releasing the potential energy as kinetic energy to operate the generator over a period of time. One example of a latter embodiment, is a clockwork/generator mechanism of the type used in "Freeplay" Radios sold by Freeplay Market Development, Ltd. Cape Town, South Africa. Wind and water power adapters can also be provided for using environmental forces for providing kinetic energy to operate a generator or for storage as potential energy.

In still other embodiments, dock 10 can have a recharging system 48 that incorporates an array of solar cells (not shown) or a fuel cell (not shown) to provide power for recharging rechargeable power source 46.

In other embodiments, dock 10 can have a power supply 44 without a rechargeable power source 46, but that is nevertheless capable of providing sufficient energy during the docking of a camera 12 to enable downloading of images stored thereon and recharging the camera power supply without relying upon external electrical power sources. In this regard, a variety of power sources can be used to provide such functionality including but not limited to replaceable batteries, generator systems, clockwork/generator systems, environmental/generator systems, solar cells, fuel cells, and the like.

It will be appreciated that control of the recharging operation will typically be managed to avoid overheating of and/or damage to the rechargeable camera power supply 42. Accordingly, a power control circuit 52 is provided for managing the recharging operation. In the embodiment shown in FIG. 4, controller 32 performs this function. Specifically, controller 32 is adapted to sense an amount of power remaining in a battery for camera 12 and to execute a recharging strategy where necessary. In one embodiment, controller 32 exchanges data with camera controller 37 to obtain data from camera 12 to determine whether enough power is remaining in camera battery 42 for a desired period of use. In another embodiment, controller 32 cooperates with a sensor device (not shown) that is connected to camera battery 42. Such a sensor device can take any a variety of forms that are well known in the art for sensing a voltage level and for providing a signal from which a controller can make a determination as to whether to engage in a charging operation.

Where controller 32 determines that is necessary to charge camera power supply 42, controller 32 can apply power from dock power supply 44 through electrical connector 34 and camera connector 36 to charge camera power supply 42. On occasion, camera 12 will have a camera power supply 42 comprising a nickel cadmium battery. To ensure that such batteries have a long useful life, such batteries should be recharged only where these batteries have been first drained of all stored power. Accordingly, in one embodiment, where controller 32 determines that dock 10 is likely connected to a camera 12 having such a nickel cadmium battery, controller 32 can be adapted to execute a recharging strategy that first insures that nickel cadmium battery is drained of power before initiating the processor providing power from dock power supply 44 to charge the camera power supply 42. In one embodiment of this type, where dock power supply 44 contains a rechargeable power source 46, the process of draining power from a camera power supply 42 can comprise draining the power from camera power supply 42 to charge the rechargeable power source 46 with at least a part of the drained power used to charge the camera power supply 42. In this way, camera power supply 42 is protected without unnecessarily wasting power in camera power supply 42 before recharging begins.

It will be appreciated that power supply control circuit 52 can comprise devices other than dock controller 32. Specifically, in an alternative embodiment shown in FIG. 5, a power supply control circuit 52 can comprise any suitable dedicated digital or analog electronic charging circuit of conventional design and adapted for performing the charging operations described herein. Where such a dedicated power supply circuit 52 is used, is not necessary to channel charging energy through controller 32 and instead, as shown in FIG. 5, the power supply control circuit 52 can control power flow along a direct electrical path from the source of power 44 to the electrical connector 34 through camera connector 36 to camera power supply 42. In this way, recharging of the camera power supply 42 can be performed at times when dock controller 32 and camera controller 37 are not active. For example, the amount of time required to charge camera power supply 42 is typically substantially longer than the amount of time required to download image related data from camera memory 38 to dock memory 40. Thus, it is possible to conserve energy during a charging and downloading sequence by enabling dock controller 32 and/or camera controller 37 only where they are being used for controlling the downloading portions of the docking session and thereafter disabling dock controller 32 and/or camera controller 37 so that they do not consume power.

Figure 6:
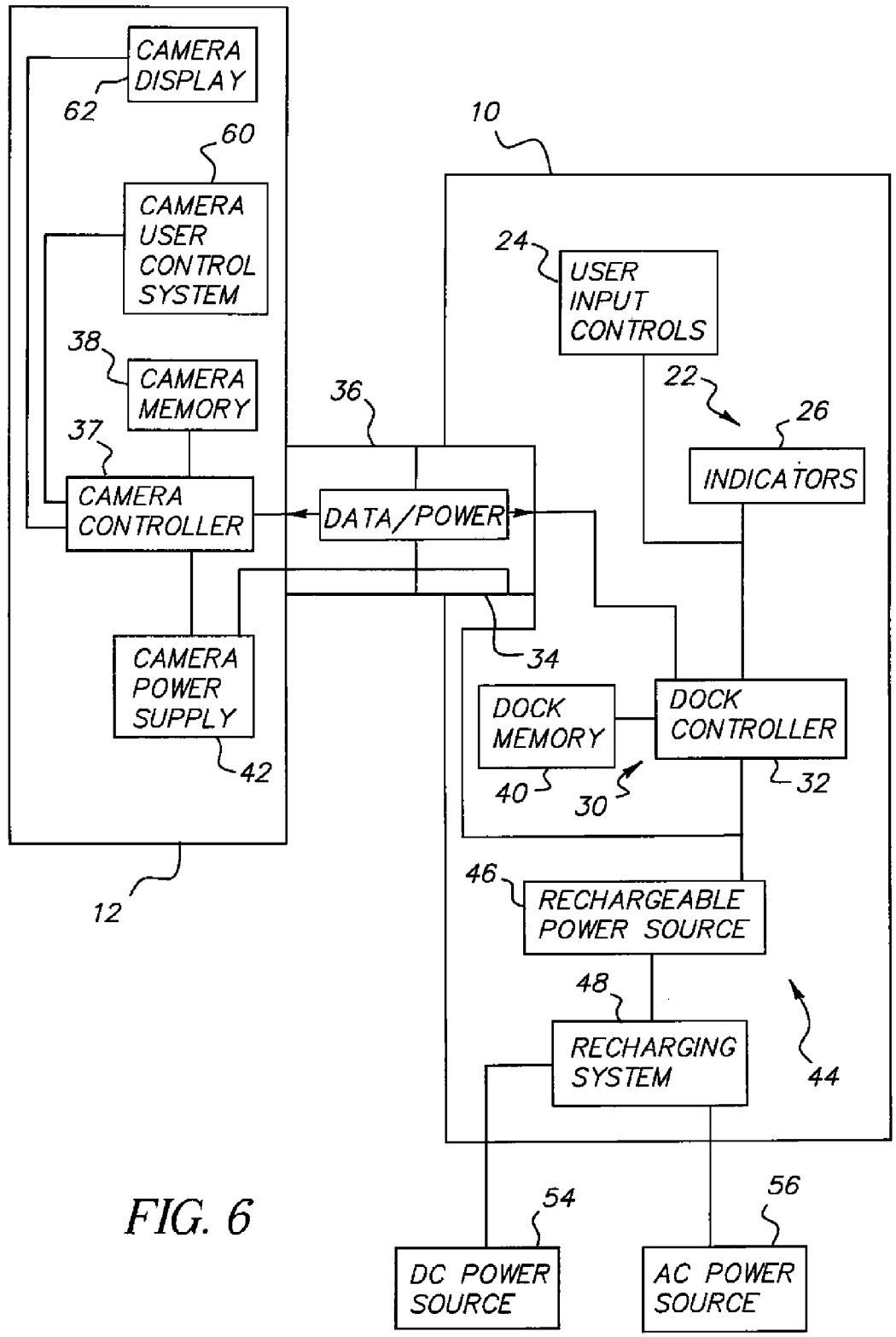
FIG. 6 shows an embodiment of the invention with direct charging electrical connection between a dock power supply and a camera power supply.

It will also be appreciated that, some types of a camera power supply 42 can be charged simply by applying a direct electrical connection between the dock power supply 44 and camera power supply 42, one embodiment of which is shown in FIG. 6.

Electrical connector 34 and camera connector 36 cooperate to exchange power in a variety of ways. In some embodiments, electrical connector 34 and camera connector 36 can provide a connection between two different electrical carrying wires or some other combination of power carrying wires so that electrical power can be exchanged therethrough. Alternatively, in other embodiments, electrical connector 34 and camera connector 36 can be adapted to transfer power by transmitting and/or receiving an electromagnetic field, such as by way of an inductive or other electro-magnetic type of coupling. This allows power to be transferred without requiring a physical engagement between the electrical connector 34 and camera connector 36. This also allows dock 10 and camera 12 to be manufactured in a more weather resistant fashion.

Returning now to FIGS. 1 and 4, dock 10 can be adapted with a user interface system 22 having input controls 24 and indicators 26. Input controls 24 can comprise any type of transducer or sensor adapted to sense a user action and to provide a signal that is detectable by dock controller 32. Dock controller 32 can use such a signal for purposes such as determining when to initiate a data exchange and/or charging sequence, cancel data exchange or and/or charging session or for adjusting a data exchange and/or transfer sequence. Indicators 26 comprise any form of display that can be used to provide information to a user of dock 10 that indicates the status of conditions in dock 10 and/or camera 12. For example, indicator 26 can provide at least one visible indication from which a user can determine, at least one of: the relative amount of power remaining in the camera power supply 42, the relative amount of power remaining in the dock power supply 44, or the extent to which the process of recharging the camera power supply 42 has been completed. Dock indicators 26 can comprise single or multiple element displays. Further, in some embodiments, dock indicators 26 can incorporate an LCD or OLED or other type of monochrome or pixelated display which can be used for presenting images such as status indications or image related data. Typically, the power supply control circuit 52 will be adapted to operate each such indicator so that the indicator provides an actor indication.

Indicators 26 can also provide a visible indication of the status of an action of transferring data between the camera memory 38 and the dock memory 40. Controller 32 will typically be adapted to operate the transfer status indicator to provide an accurate indication of the status of the transfer.

Figure 7:
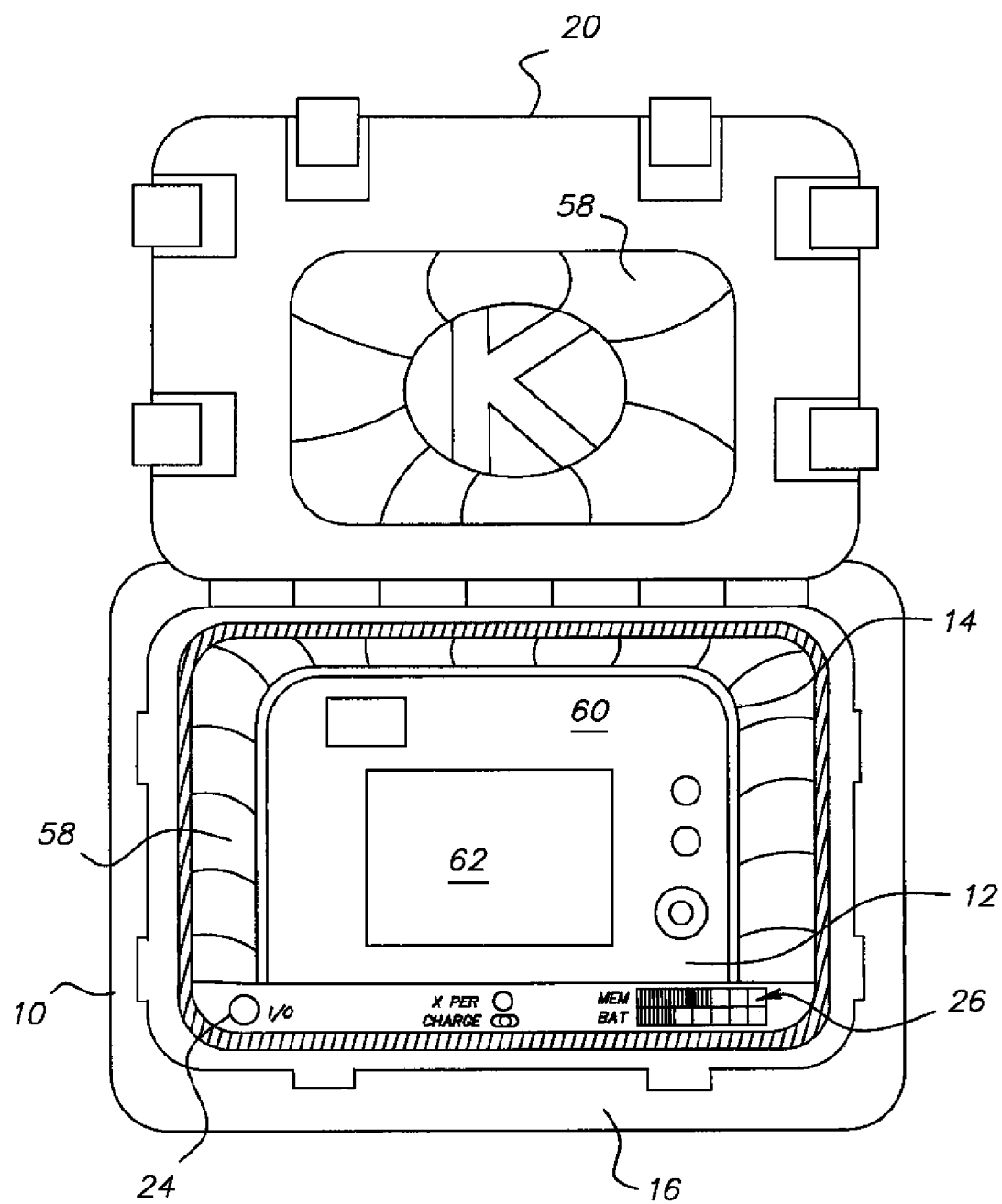
FIG. 7 shows an embodiment of the invention wherein the camera is positioned to cooperate with the dock.

As shown in FIG. 7, in one embodiment of the invention, camera 12 is positioned in receiving area 14 so that camera user controls 60 and/or a camera display 62 are visible through opening 18. In such an embodiment, controller 32 can cooperate with camera 12 so that user interface system 22 can receive user input by way of user controls 60 on camera 12 and can present images such as status indications or image related data on display 62.

Dock memory 40 can take any of a variety of forms. Dock memory 40 can comprise an internal memory device that is incorporated into dock 10 and is difficult remove from body 16 or dock memory 40 can comprise a memory that is adapted for easy removal from dock 10 or any combination thereof. For example, in one embodiment, dock memory comprises both of a hard disk drive such as an IBM Microdrive™ with a large disk drive capacity for example >1 GB and a removal memory such as a CompactFlash or secure digital memory card. Memory 40 can take other forms, and can comprise, for example, an optical disk writer adapted to convert image related content received by dock 10 into optically encoded data record on a disk such as a digital versatile disk or a compact disc. Dock memory 40 can also take the form of semiconductor memory and/or other forms of memory capable of storing digital data. It will be appreciated that the relationship between the memory storage capacity of dock memory 40 and the memory storage capacity of camera 12 determines, in general, the number of times that image related data from camera memory 38 can be downloaded to dock memory 40 before dock memory 40 is fully utilized.

Dock 10 will typically have a memory 40 with sufficient memory capacity to store image related data provided by camera 12 in multiple downloading sessions such as a memory capacity that is a multiple of the memory capacity of camera memory 38. However, in other embodiments, dock 10 will have memory 40 with a memory capacity that is equal to or even less than the memory capacity of camera memory 38. Such an arrangement can, nevertheless, be useful in enabling a user of camera 12 to effectively extend the image storage, capture and presentation capacity of camera 12 to a meaningful extent while offering a light weight, low cost and/or small sized dock 10.

A user can manually designate what image related content stored in camera 12 is to be uploaded to dock 10. Alternatively, dock 10 can have a dock controller 32 that is adapted determine alone, or in combination with camera controller 37 when camera 12 has image related data stored in the camera memory that has not yet been stored in the dock memory and is adapted to automatically cause such image related data to be stored in the dock memory. In certain embodiments, controller 32 can be further adapted to cause selected image related data to be removed from camera memory 38 after the image related data has been successfully transferred to dock memory 40.

Figure 8:
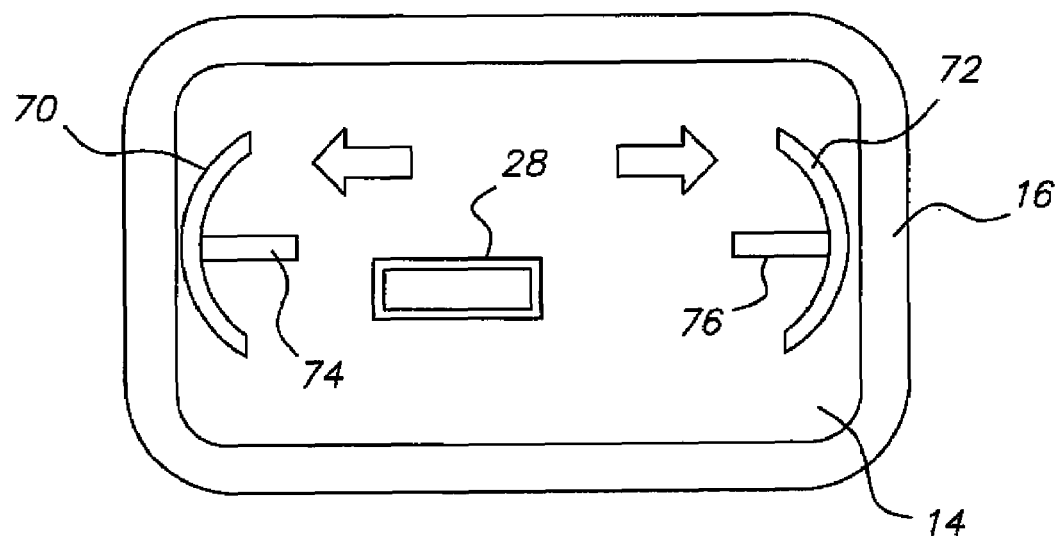
FIG. 8 shows a receiving area of one embodiment of the invention with mobile gripping surfaces.
Figure 9:
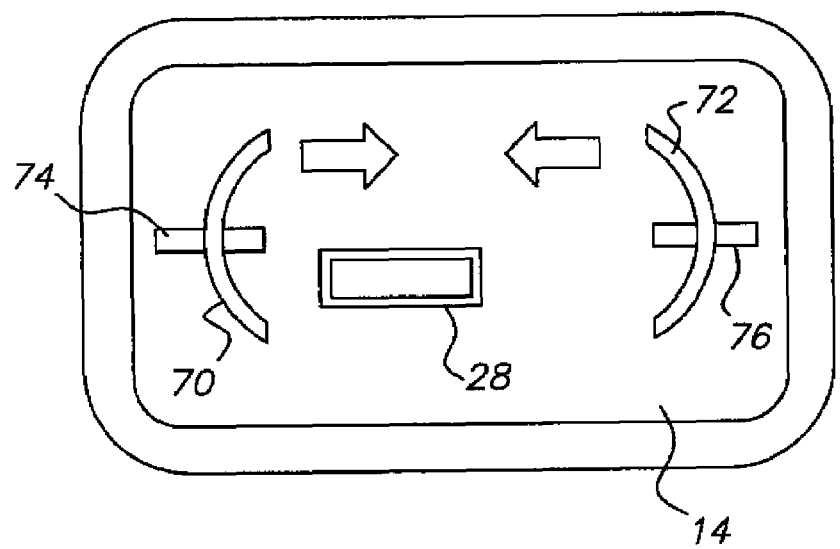
FIG. 9 shows another view of a receiving area of the embodiment of FIG. 8 of the invention with mobile gripping surfaces.

Dock 10 can be adapted to receive any of a variety of digital cameras 12. As shown in FIGS. 8 and 9, dock 10 can be adapted with a receiving area 14 having gripping services 70 and 72 are adjustable along slide paths 74 and 76 respectively so that a variety of sizes of digital cameras can be positioned for engagement with electrical connector 34 and held in engagement therewith.

It will be appreciated that in one embodiment, dock 10 provides a measure protection for the camera 12 when camera 12 is located in receiving area 14. For example, dock 10 of FIG. 1 can have a cover 20 and body 16 that are adapted, when closed, to resist then entry of any of fluids, humidity, dust and debris, and contaminants into receiving area 14.

Further, FIG. 7 shows one embodiment of a dock 10 that is intended to provide a receiving area 14 that can protect a camera 12 stored therein. In the embodiment of FIG. 7, body 16 and cover 20 are defined so that dock 10 and camera 12 stored in receiving area 14 will float in water when closed. Further, dock 10 of FIG. 7 is shown with the cover 20 and body 16 adapted to provide a measure of shock or vibration protection to camera 12 while camera 12 is located within receiving area 14. In this regard, receiving area 14 and cover 20 can provide padding 58 that is substantially surrounds camera 12 to absorb shock, vibration, or other accelerations that camera 12 would be otherwise exposed to.

In certain embodiments, the protection of camera 12, particularly during transport, is an important consideration. In this regard, dock 10 can provide such protection by providing any or all of: a) a larger and thus more stable footprint, b) internal cushioning, and c) a sealed enclosure. The outside of body 16 can have a carrying strap and be constructed of impact resistant material which may be hard or soft to the touch, and which may have high esthetic value, such as of brushed aluminum, ceramics, or leather.

Figure 10:
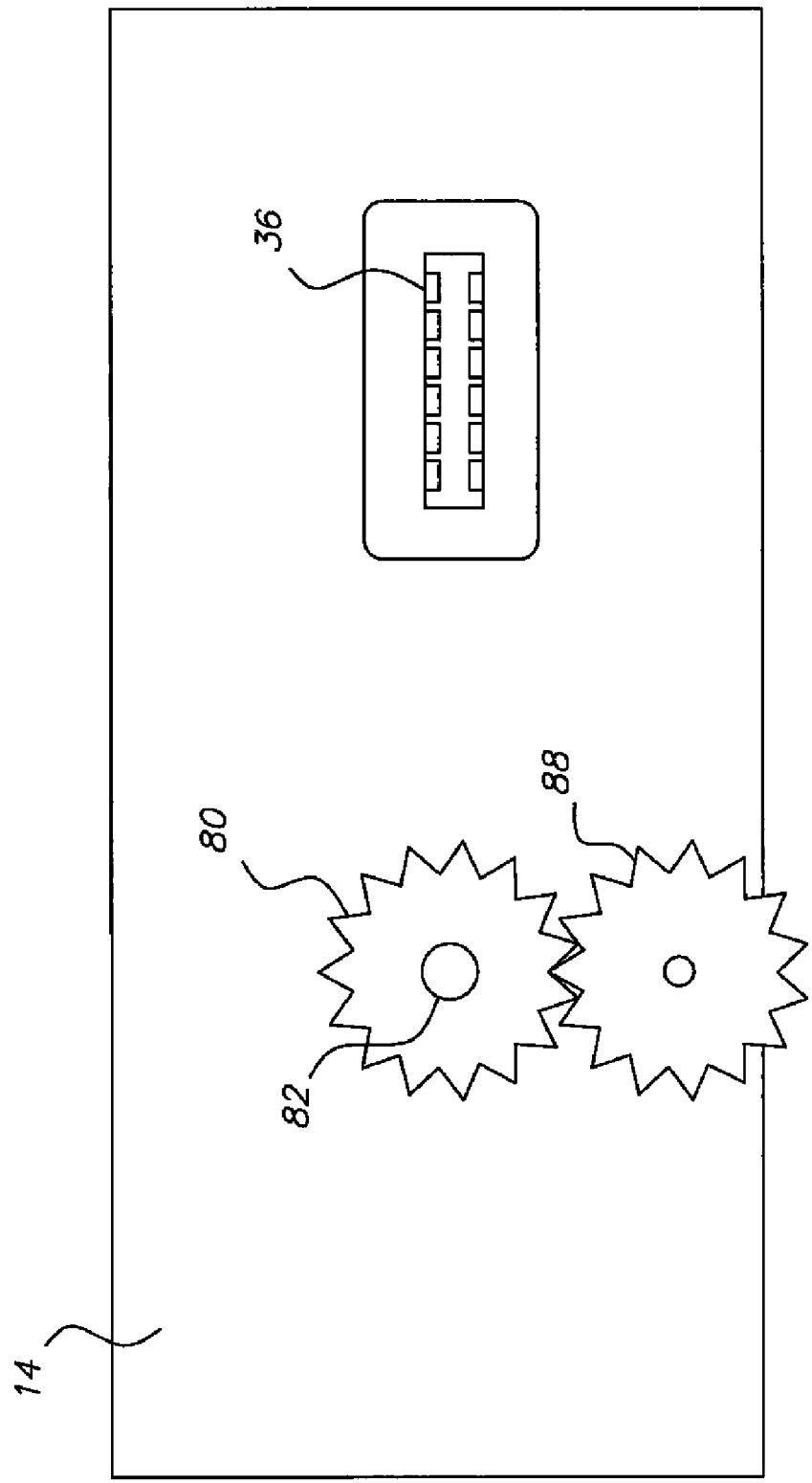
FIG. 10 shows one embodiment of a mechanism for locking camera for engagement with an electrical connector in a receiving area of a dock.
Figure 11:
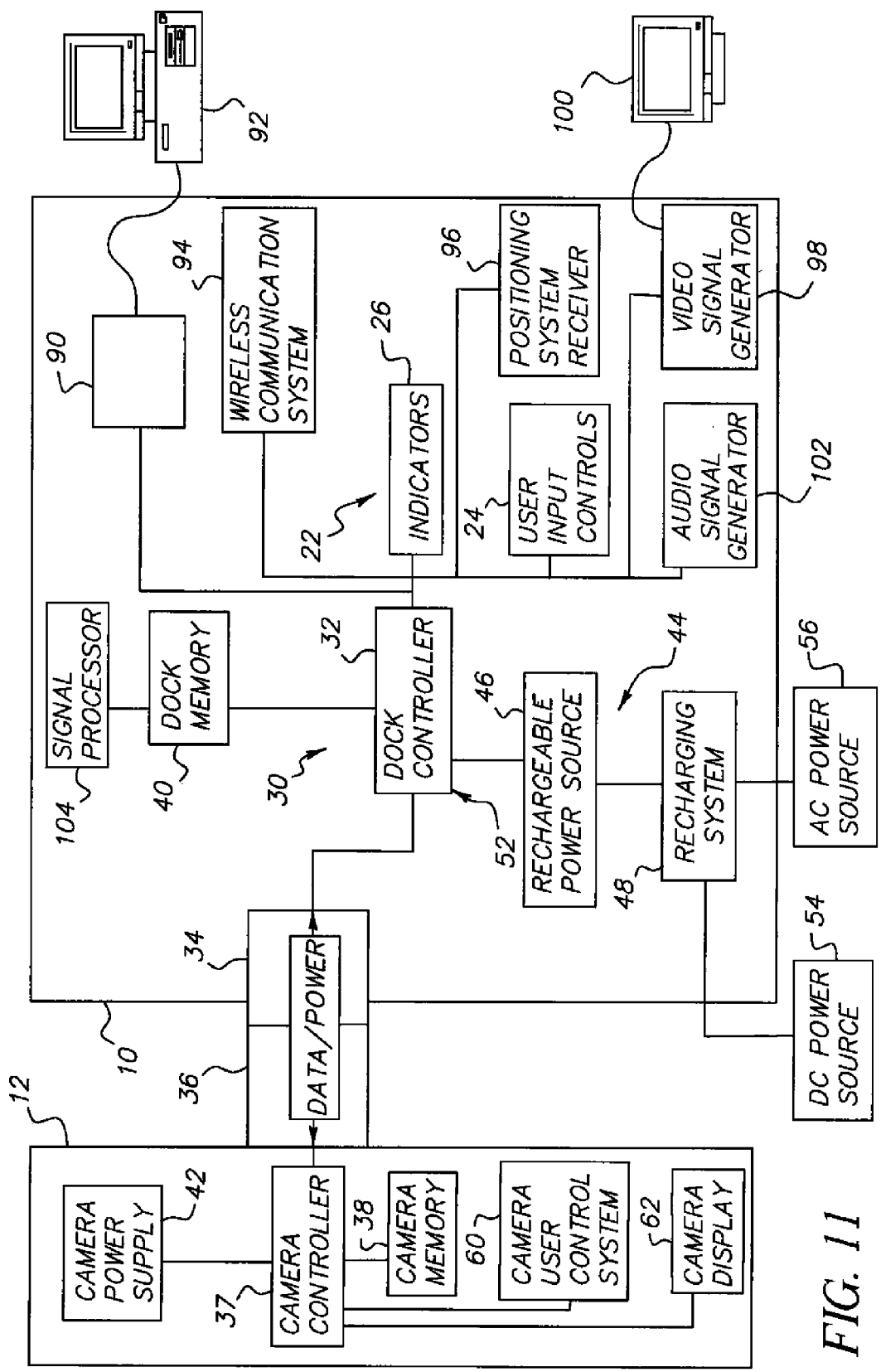
FIG. 11 shows still another schematic illustration of the dock and camera.

As is shown in FIG. 10, in another embodiment a locking mechanism can be used to secure camera 12 in engagement with electrical connector 34. As is shown in FIGS. 10 and 11, receiving area 14 provides a thumb wheel 88 which engages primary gear 80. The primary gear 80 has extending upwards of its rotational axis, fastener 82, such as a standard ¼ inch—20 threaded fastener aligns with a tripod mount receptacle on the bottom of camera 12 (not shown). It will be understood that by rotating thumbwheel gear 88, primary gear 80 begins to rotate which screws fastener 82 into or out of the tripod mount receptacle. This locking mechanism illustrated in FIG. 10 is but one possible embodiment, and may take any other form known in the art. However, it will be understood that the need for such a secure mechanical constraint is inventive and new for a dock 10 in that the primary purpose is to assure electrical interconnection integrity.

It will be appreciated that, in other embodiments, dock 10 can provide additional functionality. For example, FIG. 11 provides a schematic illustration of one embodiment of this type. As shown in FIG. 11, dock 10 provides additional connector 90 adapted to engage an external data device 92, such as the personal computer shown in FIG. 11, a kiosk (not shown), an image viewer (not shown), a computer network (not shown), a cellular telephone (not shown), a personal digital assistant (not shown), or like circuit or system. This can comprise, for example, a conventional RS 232 connection, a Universal Serial Bus (USB) connector, an Ethernet connection, a FireWire connection, or the like. This enables dock 10 to be connected directly to a personal computer, kiosk, or like device for uploading of images from dock memory 40 to such a personal computer or kiosk.

In certain embodiments, dock 10 can also use additional connector 90 to receive power directly from the external data device 92 for providing recharging power to an embodiment of dock 10 having a rechargeable power source 46. For example, the USB system provides a line that can convey limited amounts of power from a personal computer or other USB enabled device through the USB connection. This limited amount of power can be used to charge rechargeable power source 46 over time.

In certain embodiments, dock 10 can be operable in one of two modes, a stationary mode, wherein dock 10 is connected to an external data device 92 and functions in a manner that is consistent with a stationary dock, such as allowing convenient transfer of data from camera 12 to external data device 92. Further, while in the stationary mode recharge camera power supply 42 and/or rechargeable power source 46 can be recharged with power supplied for example, by an AC external source 56, with power supplied by external data device 92 or some combination thereof. In such embodiments, dock 10 is also operable in a portable mode wherein dock 10 exchanges data and recharges camera 12 as described generally above.

By using dock 10 as a conventional dock in the stationary mode as described above, both of dock 10 and camera 12 can be maintained in a ready state for portable use with camera memory 38 and dock memory 40 having a desirable level of image related content storage capacity available and with camera power supply 42 and rechargeable power supply 46 being fully charged.

Also shown in FIG. 11 is a wireless communications system 94 such as cellular telephone or paging communication system. Such a system can be used by docking dock 10 to automatically upload image related data from docking dock memory 40 to a remote server. In this way, controller 32 can determine when the amount of image related data stored in dock memory 40 exceeds a threshold and can automatically cause images image related data to be transferred from dock 10 to a external device such as a computer, network or kiosk, or other like device so as to make additional memory capacity available for storage of later obtained image related data.

Alternatively, wireless communication system 94 can comprise a wireless communication system such as a radio frequency, non-radio frequency, or other wireless electromagnetic signal, infrared or other wireless communication system that can communicate with camera 12, or with a personal computer, kiosk or the like for transferring data. Where such a wireless communication ability is available, image related data can be exchanged using such system and without use of electrical connector 34, which, in such an embodiment could be used simply to provide operational power and recharging power to camera 12. Similarly, controller 32 can use wireless communication system 94 to cause image related data to be transferred from the dock memory 40 to an external device.

As is further shown in FIG. 11, dock 10 can provide other features such as a radio frequency location system such as a Global Positioning System receiver 96 that is adapted to receive radio frequency signals from which the location of the dock can be determined. The global positioning receiver can record date and camera memory 38 indicating a location at the dock 10 was located at over a period of time. The date and time and which images captured by the camera 12 can be cross-referenced against such a stored list of locations and can be used to associate, generally, location information with image related data provided by camera 12 such as by associating location based metadata with image related metadata when the image related data is stored in the dock memory 40.

A video signal generator 98 can also be provided that is adapted to generate video output signals representative of image related data stored in the docking station memory 40 adapted to enable an external display device 100 such as a conventional television to receive the video output signals so that the external display device 100 can present images representative of the images stored in the docking station memory.

As is also shown in FIG. 11, dock 10 can also comprise an audio signal generator 102 adapted to generate audio output signals representative of sound stored in the dock memory and an output circuit adapted to enable an external device to receive the audio output signals so that the external device can present sound representative of the sound stored in the dock memory.

As is further shown in the embodiment of FIG. 11, dock 10 can have a signal processor 104 adapted to modify the image related data such as by adjusting the data compression strategy used for storing the image related data or by adjusting the content of the image related data scene duration. Examples of such content based adjustments include but are not limited to scene sequencing, aspect ratio information, rotation, apparent magnification, or crop adjustment, color correction, exposure correction, red eye correction, and/or adjusting the image related data by inserting text, graphics, or metadata in the image related.

It is noted, that the dock 10 may additionally provide room for protective storage of other items, such as retractable power cord 28, data cables, the camera's operation manual, and the like.

The invention has been described in detail with particular reference to certain preferred embodiments thereof, but it will be understood that variations and modifications can be effected within the spirit and scope of the invention.

PARTS LIST

| | |
|---|---|
| 10 | docking case |
| 12 | camera |
| 14 | receiving area |
| 16 | body |
| 18 | opening |
| 20 | cover |
| 22 | user interface system |
| 24 | user input controls |
| 26 | indicators |
| 28 | retractable power cord |
| 30 | control system |
| 32 | dock controller |
| 34 | electrical connector |
| 36 | camera connector |
| 37 | camera controller |
| 38 | camera memory |
| 40 | dock memory |
| 42 | camera power supply |
| 44 | dock power supply |
| 46 | rechargeable power source |
| 48 | recharging system |
| 52 | power supply control circuit |
| 54 | DC source |
| 56 | AC source |
| 60 | camera user control |
| 62 | camera display |
| 70 | gripping surface |
| 72 | gripping surface |
| 74 | slide path |
| 76 | slide path |
| 80 | primary gear |
| 82 | fastener |
| 88 | thumb wheel |
| 90 | additional connector |
| 92 | external data device |
| 94 | wireless communication system |
| 96 | positioning system receiver |
| 98 | video signal generator |
| 100 | external display device |
| 102 | audio signal generator |
| 104 | signal processor |

The invention claimed is:

1. A portable dock for use with a camera having a camera memory and a rechargeable camera power supply, the portable dock comprising:

a dock memory;

a dock power supply having a source of power with sufficient power so that the camera power supply can be charged with at least sufficient additional power to enable the camera to perform completely at least one additional camera function;

an electrical connector that engages a mating camera connector for data communication and power exchange therethrough;

a control system that enables the transfer of image related data between the camera memory and the dock memory;

a body holds the dock memory, power supply, electrical connector and control system, said body receives the camera so that the camera connector can engage the electrical connector; and a circuit that receives radio frequency signals from which a location of the portable dock is determined, said control system stores information indicating changes in the location of the dock over a period of time, said control system further associates any image data received during the period of time with location information.

2. The dock of claim 1, wherein said body stores said camera within a chamber in said body that resists entry of at least one of water, other fluids, dust, and debris into the chamber.

3. The dock of claim 1, wherein said body stores said camera within said body and further protects the camera from exposure to water, humidity, and wherein said body floats when immersed in water.

4. The dock of claim 1, wherein said body stores said camera within a chamber in said body and said body absorbs energy to protect the camera from shock or vibrational damage.

5. The dock of claim 1, wherein said control system drains power from the camera battery before charging the camera battery and stores the drained power so that at least a part of the drained power can be used to charge the dock power supply.

6. The dock of claim 5, wherein the control system stores at least a part of the drained power in the rechargeable power source.

7. The dock of claim 5, wherein the rechargeable power source of the dock power supply comprises removable batteries and wherein the control system conditions power provided by the removable batteries for use in charging the camera batteries.

8. The dock of claim 1, wherein the power supply comprises a rechargeable power source and receives recharging energy from at least one of a generator, a solar power source, or an external power supply.

9. The dock of claim 1, wherein the memory comprises at least one of a hard drive embedded in the dock, a hard drive that is removable from the dock, an electronic semiconductor memory, an optical memory.

10. The dock of claim 1, further comprising a video signal generator that generates video output signals representative of images stored in the dock memory and an output circuit that enables an external device to receive the video output signals so that the external device can present images representative of the images stored in the dock memory.

11. The dock of claim 1, further comprising an audio signal generator that generates audio output signals representative of sound stored in the dock memory and an output circuit that enables an external device to receive the audio output signals so that the external device can present sound representative of the sound stored in the dock memory.

12. The dock of claim 1, further comprising a circuit that provides a digital signal containing image related data for use by any device that is external to the dock via an electronic connection.

13. The dock of claim 1, further comprising a signal processor that adjusts the data compression strategy used for storing the image related data or the content of the image related data.

14. The dock of claim 13, wherein the signal processor adjusts any of the scene duration, scene sequencing, aspect ratio information, rotation, apparent magnification, or crop adjustment, color correction, exposure correction, red eye correction, insert text, graphics, or metadata in the image.

15. The dock of claim 1, wherein the additional camera function comprises the transfer of at least one image to the dock.

16. The dock of claim 1, wherein the control system senses when the camera has image related data stored in the camera memory that has not yet been stored in the dock memory and automatically causes such image related data to be stored in the dock memory.

17. The dock of claim 1, wherein the control system causes selected image related data to be removed from the camera memory after the image related data has been successfully transferred to the dock memory.

18. The dock of claim 1, further comprising a power control circuit that controls charging of the rechargeable camera power supply with power from the source of power.

19. The dock of claim 18, having at least one visible indicator from which an observer can determine a relative amount of power remaining in the camera power supply, a relative amount of power remaining in the portable dock; an extent to which a process of recharging the camera power supply has been completed, or combinations thereof, wherein the power supply control circuit operates each indicator so that the indicator provides an accurate indication.

20. The dock of claim 1, wherein said dock power supply includes a collector that converts solar energy to electrical energy.

21. The dock of claim 1, wherein said dock power supply includes a generator that converts kinetic energy into electrical energy.

22. The dock of claim 21, wherein said dock power supply further includes a mechanism for mechanically storing potential energy and releasing the potential energy as kinetic energy to operate the generator.

23. The dock of claim 1, further comprising a transfer status indicator that provides a visible indication of a status of an action of transferring data between the camera memory and the dock memory, wherein the portable dock further comprises a controller operating the transfer status indicator to provide an accurate indication of a status of the transfer.

24. The dock of claim 1, further comprising a circuit providing a wireless digital signal containing image related data for use by a device that is external to the dock.

25. The dock of claim 1, further comprising an external connector exchanging data and receiving power from an external data device.

26. The dock of claim 1, wherein the dock exchanges power with the camera by way of an electro-magnetic coupling.

* * * * *